US 6,967,045 B1

(12) United States Patent
Bertram (10) Patent No.: US 6,967,045 B1
(45) Date of Patent: *Nov. 22, 2005

(54) INTEGRATED COMPOSITE STRUCTURAL CONDUIT FORMED IN PLACE

(76) Inventor: Richard L. Bertram, 2770 Sea Ridge Dr., Malibu, CA (US) 90265

( * ) Notice: Subject to any disclaimer, the term of this patent is extended or adjusted under 35 U.S.C. 154(b) by 0 days.

This patent is subject to a terminal disclaimer.

(21) Appl. No.: 09/097,221

(22) Filed: Jun. 12, 1998

(51) Int. Cl.$^7$ .................. B29D 22/00; B29D 23/00; B32D 1/08
(52) U.S. Cl. .................. 428/36.91; 428/424.6; 156/294; 156/94; 156/299; 156/78
(58) Field of Search .................. 156/78, 94, 293, 156/294, 297, 299; 428/36.1, 36.2, 36.5, 428/36.7, 36.91, 424.6

(56) References Cited

U.S. PATENT DOCUMENTS

| | | | | |
|---|---|---|---|---|
| 2,388,297 A | 11/1945 | Slaughter | | 154/42 |
| 3,198,692 A | 8/1965 | Bridgeford | | 161/188 |
| 3,625,259 A | 12/1971 | Kennedy, Jr. | | 138/145 |
| 3,742,985 A | 7/1973 | Rubenstein | | 138/141 |
| 4,009,063 A | 2/1977 | Wood | | |
| 4,015,044 A * | 3/1977 | Ranney et al. | | 428/419 |
| 4,060,439 A * | 11/1977 | Rosemund et al. | | 156/78 |
| 4,112,176 A | 9/1978 | Bailey | | 428/304 |
| 4,296,156 A | 10/1981 | Lustig et al. | | 428/35 |
| 4,307,000 A | 12/1981 | Vasta | | 260/18 TN |
| 4,585,371 A | 4/1986 | Jones-Hinton | | 405/153 |
| 4,590,218 A | 5/1986 | Vass | | 521/50 |
| 4,602,974 A | 7/1986 | Wood et al. | | 156/287 |
| 4,728,223 A | 3/1988 | Rice | | 405/154 |
| 4,732,632 A | 3/1988 | Pieslak et al. | | 156/86 |
| 4,792,493 A | 12/1988 | Bertram et al. | | 521/51 |
| 5,017,258 A | 5/1991 | Brown et al. | | 156/294 |
| 5,029,615 A * | 7/1991 | Muller et al. | | 138/98 |
| 5,190,705 A | 3/1993 | Corazza | | 264/36 |
| H1163 H | 4/1993 | Bone | | 156/294 |
| 5,241,993 A | 9/1993 | Stephens | | 138/98 |
| 5,268,392 A | 12/1993 | Bertram | | 521/51 |
| 5,279,882 A | 1/1994 | Daude et al. | | 428/192 |
| 5,357,005 A | 10/1994 | Buchwalter et al. | | 525/436 |
| 5,389,692 A | 2/1995 | Bertram | | 521/51 |
| 5,458,155 A | 10/1995 | Stephens | | 138/98 |
| 5,817,200 A * | 10/1998 | Offill | | 156/94 |
| 5,879,501 A * | 3/1999 | Livington | | 156/242 |
| 6,673,193 B1 * | 1/2004 | Bertram | | 156/315 |

FOREIGN PATENT DOCUMENTS

| | | |
|---|---|---|
| EP | 0 475 769 A1 | 3/1992 |
| FR | 1591995 | 6/1970 |
| GB | 2 123 919 A | 2/1984 |
| JP | 55-103995 | 8/1980 |

* cited by examiner

OTHER PUBLICATIONS

Union Carbide Corporation, "UCAR Solution Vinyl Resins for Coatings", Union Carbide Corporation, 39 Old Ridgebury Road, Danbury, CT 06817.

*Primary Examiner*—Michael C. Miggins
(74) *Attorney, Agent, or Firm*—Hall, Vande Sande & Pequignot (57) ABSTRACT

A composite, chemically integrated material structure bearing load around a close-loop structural configuration in cross-section, has a plurality of regions through the cross-sectional thickness imparting at selectively predetermined locations within the cross-section, high tensile strength and high compressive strength. A method for forming such an integrated, composite material structure onto and incorporating an established or pre-existing, but likely deteriorated, concrete or brick structure, while achieving precise, predetermined resulting interior diameter and other structural dimensions is described.

14 Claims, 5 Drawing Sheets

INTEGRATED COMPOSITE STRUCTURAL CONDUIT FORMED IN PLACE

BACKGROUND OF THE INVENTION

1. Field of the Invention

The present invention relates to the art of fluid conduits, and more particularly to the construction of restored fluid conduits in place having greater structural strength than the pre-existing original fluid conduits.

2. Description of Related Art

Waste water and sewerage frequently are conducted through fluid conduits of concrete, brick and similar porous material. Conduits deteriorate for various reasons, including hydrogen sulfide related corrosion. Conduits, including concrete and steel structures, corrode with consequent loss of strength, and must be quickly repaired cost effectively for the long term. See, generally, "Sulfide in Wastewater Collection and Treatment Systems," Ch. 2, American Society of Civil Engineers (1989).

Herein in this specification for simplicity of explanation, the term "conduit" will be used to mean and include conduits, pipes, box tunnels, culverts, and enclosed containers, pump stations and wet wells and the like, unless the text herein indicates otherwise.

The sewer infrastructure is such that it is often desired and sometimes necessary to restore or refurbish existing deteriorated sewer conduit rather than construct new sewer conduit. In the past, several modalities have been used to restore existing but deteriorated sewer conduits. One method, for example, is to remove the earth above the sewer, and construct a new conduit parallel to, or in place of, the old structure. Such a method necessarily involves great inconvenience to people using the roads, buildings and other structures which were made unusable during such a restoration project.

Another modality is to apply fresh concrete within the conduit to the interior surfaces of the conduit that have eroded. Such a method results in a conduit no better than the one corroded in the first place. Further, the timing during the usual daily cycle of sewer flow, when such repairs usually are made, becomes a problem where the repair must be made while the sewer is in ongoing use. The length of time necessary for concrete to set is substantial, which forces any restoration project to be performed in limited stages. Thus, fresh concrete is applied to a limited length, or to only a portion of the inner circumference, of a conduit during the first night's work, and allowed to set. The workers and their various tools, vehicles, etc. must evacuate the conduit until the next night's work window in the daily cycle when the workers can re-enter the conduit. In the interim time between these work windows, that is, during the day, the waste water level will have risen, often filling up the conduit to, or near to, the crown, leaving various deposits and/or contaminates on the freshly poured or set concrete. During the next successive night's work, fresh concrete is poured to adjoin the previous night's application, but there will be these contaminates and deposits like a thin film covering the interface surfaces with the concrete of the previous night's application. The interface between the two applications is sometimes called a "cold joint."

Another method for restoring a conduit is described as "slip lining," where a new pipe is inserted within the old conduit. Such a method necessarily reduces the interior diameter of the conduit. Further, problems are presented when encountering connecting lateral pipes and like anomalies in the sewer lines.

Another method of restoring existing sewer conduit has been taught in which a corrosion resistant layer of material, such as polyvinyl chloride is positioned within the corroded conduit, where the layer has widely separated spikes and/or ribs, including "T" shaped spikes or ribs, formed on the side or surface facing away from the conduit interior and through the corroded conduit. The polyvinyl chloride layer is supported in position while fresh concrete or other setting material is poured between the layer and the corroded conduit. The setting material, such as, for example, concrete, surrounds the "T" ribs or spikes before setting, and in ideal conditions forms a mechanical connection between the polyvinyl layer and the newly set concrete. In such a system, however, the connection between the polyvinyl chloride layer and the newly set material is purely mechanical. Further, the area of connection is limited by the area of the overhang of the top of the widely separated "T" shaped ribs or spikes, typically approximately five percent of the total plastic area being held. Further still, any load transfer from the top of the existing conduit from the conduit to the polyvinyl chloride, in the best of configurations, aside from friction, is limited by the geometry of the rib or spike structure; that is, such load must pass from the shank or pole of the rib or spike.

In the past, as a solution to such problems, it has been taught to place a sheet of lining or layer of polyvinyl chloride layer over a traveling, collapsible form movably positioned inside the conduit. When positioned, the form is expanded, pushing the lining or layer into position to have grout or cementitious material inserted between the lining, or layer, and the conduit's inside wall. Such restoration projects necessarily require specially constructed vehicles to carry and position the collapsible forms, and rely on cementitious repair materials which are also subject to corrosion. Repairs with a single plastic mechanically anchored, non-bonded lining material are subject to punctures and seam leaks, which expose the underlying repair material or original substrate to corrosive gases and liquids. This can result in separation of the lining material from the substrate and could result in a catastrophic failure, including a separated lining material clogging the conduit.

Another method employs a non-mobile construction framework within the conduit, which supports or holds the lining or layer in place while the cementitious material is inserted between the lining, or layer, and the conduit. In all of these methods where cementitious material is built up within the conduit, cold joints result not only between the cementitious material and the conduit, but also between the successive insertions of the cementitious material.

Other methods of restoring corroded conduit by positioning a sheet of material inside the conduit involve the insertion within the conduit of a tube, sometimes inverted, of polyester or vinyl ester saturated felt-sock or like material, or folded thermoplastic material. The tube within the conduit is pressurized to expand the tube to be in contact with the interior of the conduit. Then, heat is applied to commence a setting process. There is little or no chemical bonding between the tube and the host conduit. The resulting restored pipe has little added to the strength of the pipe from its deteriorated, weakened pre-restoration condition, since the added layer or sheet must be thin enough, or at least flexible enough to respond fully to the inflating pressures expanding the tubular layer out to the inner surface of the conduit.

Some of these systems have a sheet of inner lining or polyvinyl chloride layer primarily to provide resistance to the corrosives in the conduit. Also, some of the systems require significant elaborate devices and complicated removable support devices to complete the installation. These labor intensive devices include pressurization, traveling mobile collapsible forms, or non-mobile framework that has to be constructed in place. All such devices must be brought into the conduit and removed from a conduit after the work is done through limited access, such as manholes and hatches.

In many conduit restoration projects, it is preferred to temporarily by-pass the old conduit or perform the work while the sewer is operational. The temporary by-pass, if possible, is extremely expensive, environmentally risky, and disrupts surface businesses and street accesses. Normally, sewer flow is minimal during the hours between midnight and around 7:00 a.m. o'clock, and increases dramatically thereafter. Thus, during the entire optimal time allowed for restoration work, a period of approximately seven hours, workers must go to location within the sewer network, set up the various expanding or pressurizing apparatus and/or the frame works, preform the positioning and material application procedures, allow time for the concrete or other material to set, dismantle the construction apparatus, and then evacuate from the sewer network. However, cementitious material, such as typically concrete, requires substantial time for setting, and cold joints are inevitable. Restoring the corroded conduit with cementitious material has always had timing, performance or scheduling problems.

In the past, another method for restoring corroded concrete conduits has been building up the cement concrete behind a plastic lining layer having "T" shaped ribs or spikes. The cementitious material is inserted in the space behind the layer or lining. Because of the timing problems as described, the concrete cement can be filled between the plastic lining layer and the corroded concrete wall only to a certain height before time must be allocated for it to set. Next day, additional height is added during the permissible time window by pouring more concrete behind the polyvinyl chloride layer. The interface between the first and second nights' pouring inevitably is a cold joint, with all of the problems such a joint inherently has.

The amount of height added each day, often referred to as a "lift," is determined and limited, also, by the weight of the cementitious material which the layer or lining can support. Cementitious material weighs, typically, as much as 155 pounds per cubic foot. The layer of polyvinyl chloride, typically, is relatively thin, relatively flexible and incapable of supporting such weight if unsupported with elaborate devices or procedures. For example, various positioning and supporting apparatus, which are bulky and difficult to transport to location within the sewer network by virtue of such weight, must be installed or constructed within the conduit to hold the plastic lining layer in proper position while the concrete is poured behind it and sets, or the cementitious material is pumped in time-intensive lifts. Further, the problems associated with this procedure normally require that only a certain, less than complete height of concrete be poured and set behind the plastic lining layer each night, leaving substantial portions of the space between the conduit's inner wall and the polyvinyl chloride layer exposed to the waste water "flush" during the day of the sewer daily use cycle. As noted, such a "flush" leaves deposits or a thin film of contaminates on the back surface of the polyvinyl chloride facing the conduit's inner surface. This "flush" also leaves such deposits and contaminates on the surface of the concrete conduit. These deposits and contaminates will interfere with any bonding that may be desired between these filmed surfaces and the fresh concrete poured into the space between the plastic liner and the conduit inner wall surface.

In all of the methods discussed herein above, the plastic lining or layer is not designed to have any connection or fastening to the cementitious material between it and the conduit except by virtue of such mechanical locks as the "T" shaped ribs or spikes, or by bolts. The structural integrity of the interior of the conduit after restoration is maintained mainly by the new cementitious material supporting itself after setting, and the polyvinyl chloride layer or lining supporting itself, except by the periodic fastening by virtue of the ribs, spikes or bolts. The tensile strength of the cementitious material is relatively low, on the order of ten percent of its compressive strength. Throughout the repaired circumference, stresses are not optimally distributed and are poorly transferred between the old conduit and the new repair. Since there is no evenly distributed, universal bonding between the polyvinyl chloride layer and the cementitious material behind it, any corroding substance that penetrates the lining or layer can and usually will begin deteriorating the cementitious material behind that layer, in the same way that the concrete conduit became corroded in the first place. Consequently, any breach in that layer or lining will commence the deterioration process anew, causing the layer or lining to separate from the cementitious material behind it and to collapse.

It has also been taught also to restore such conduits by application of corrosion resistant or corrosion proof polymers to the interior surfaces of the corroded conduits. See, for example, U.S. Pat. No. 4,792,493 to Vernie L. Belcher and myself. Further, it has been shown how such a deteriorated conduit can be given additional strength, enough so that the resulting conduit after restoration is very substantially more strong and more resistant to chemical etching by the waste water bacteria and acids than the conduit. See, for example, my U.S. Pat. No. 5,268,392 and No. 5,389,692, the specifications of which are incorporated herein as though fully set forth. Such linings and coatings, even for the entire circumferential surface area of the conduit's interior surface can be applied quickly, and set within the time windows permitted in the usual sewer daily cycle, as explained in my earlier patents. Such methods as have been known, however, usually are achieved by applying the restoring materials, usually co-polymers, to the corroded conduit interiors, and building up the thickness of the materials to the desired thickness. Achieving precise interior dimensions of the final product can be difficult, however, and requires careful attention in the application procedure.

It is still desired to provide a method of restoring a corroded conduit, so that the resulting structure has precise, predetermined structural dimensions. It is desired, further, to provide a method of restoring corroded conduits which fully utilizes preexisting structure and incorporates it into a new composite structure having greater tensile, compressive and flexural strengths than possessed by the conduit as originally constructed. It is yet further desired to provide a method of restoring existing corroded conduit that results in a unified, integrated composite structural material. It is yet further desired to provide a method of restoring a corroded conduit that results in an integrated composite structural material that has structural characteristics that are predetermined with respect to strength in tension and compression at preselected locations within the structural material. It is yet a further desire to provide a method for restoring corroded conduits that results in a structure that has a thermoplastic layer facing the interior that is evenly bonded to the material between it and the conduit and more evenly bears and distributes the load borne by the conduit throughout the resulting composite structure in the regions of the original conduit, the thermoplastic layer and the material between them which is impervious to hydrogen sulfide gas and other corrosives. The present invention meets these and other needs.

SUMMARY OF THE INVENTION

In brief, in accordance with one aspect of the present invention, a chemically integrated, composite structural material for a load bearing structure, such as a sewer conduit, and a method for restoring a corroded sewer conduit with such structural material are described in which a semi-rigid section of a sheet of thermoplastic material such as polyvinyl chloride is positioned within a pre-existing, likely corroded conduit substrate having pores depending from its surface into the substrate. The position of the sheet is pre-selected so that the surface of one of its faces defines the interior dimensions of the conduit, while the opposing face faces the conduit substrate so as to define a space between the corroded substrate and the sheet. The sheet is anchored by having its opposing edges inserted into channels fastened in the conduit for that purpose. The sheet is selected for its flexural modulus characteristics, for its ability to flex into the pre-selected position, as well as for its impermeability to corrosive gases. The sheet is rigid enough to be capable of supporting the thermosetting components of the structural composite material while they cure and set in a matter of minutes. The face of the sheet facing the corroded substrate is impregnated with a reactive resin that will react with a curing agent for a cellular thermosetting resin. The thermosetting resin along with the curing agent, and along with a blowing agent, are expanded first and then inserted within the space between, and defined by, the sheet and the substrate. A selected silane is part of the thermosetting resin which chemically bonds with silica or other mineral in the substrate, resulting in a single, chemically integrated composite material having, internally, five serially proximal regions interphased with their corresponding proximal regions. The thermoplastic material is pre-selected for its flexural modulus characteristics, its ability to flex in the pre-selected position, its tensile strength, as well as its impermeability to corrosive gases. The resultant composite, integrated material structure has greater strength characteristics and longer life expectancies than the original conduit.

Other novel features which are believed to be characteristic of the invention, both as to organization and methods of operation, together with further objects and advantages thereof, will be better understood from the following description in which preferred embodiments of the invention are described by way of example.

DETAILED DESCRIPTION OF THE PREFERRED EMBODIMENTS

Figure 1:
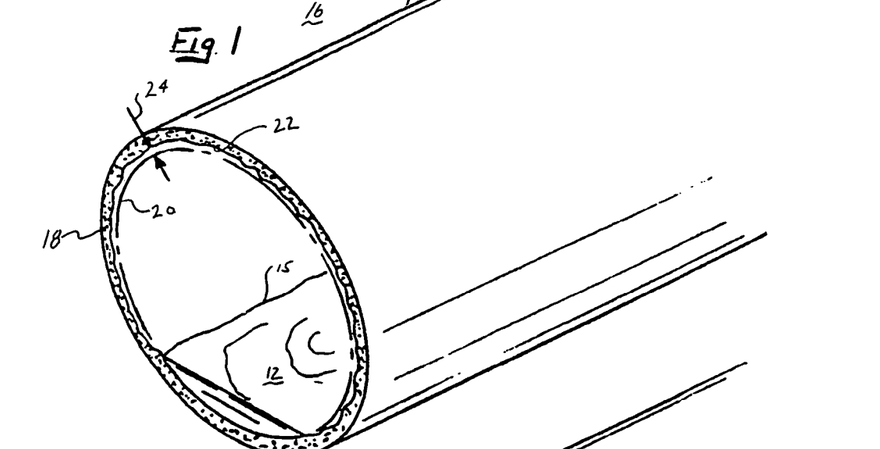
FIG. 1 is a partial perspective, cross-sectional cut away view of a fluid conduit within the ground showing the deterioration therein.

Waste water 12 normally flows in a sewer pipe or conduit 14 under ground 16, reference being had initially to FIG. 1 of the accompanying drawings wherein reference numerals correspond to like numerals given herein. The liquid level 15 of the waste water 12 rises and ebbs during a normal daily cycle. Normally, there is always some waste water 12 in the conduit 14, the level 15 depicted in FIG. 1 being a low point in this cycle. The original conduit 14 comprises a wall of substrate 18, often made of concrete or porous material. Deterioration, including corrosive action of sewerage and gases within the substantially closed environment of the conduit 14 causes substantial portions 24 of the substrate 18 to corrode and fall away. For the reasons as explained above, the original surface 20 of the substrate 18 frequently corrodes and recedes to an uneven surface 22, reducing the thickness of the substrate 18, and weakening the conduit 14.

Figure 2:
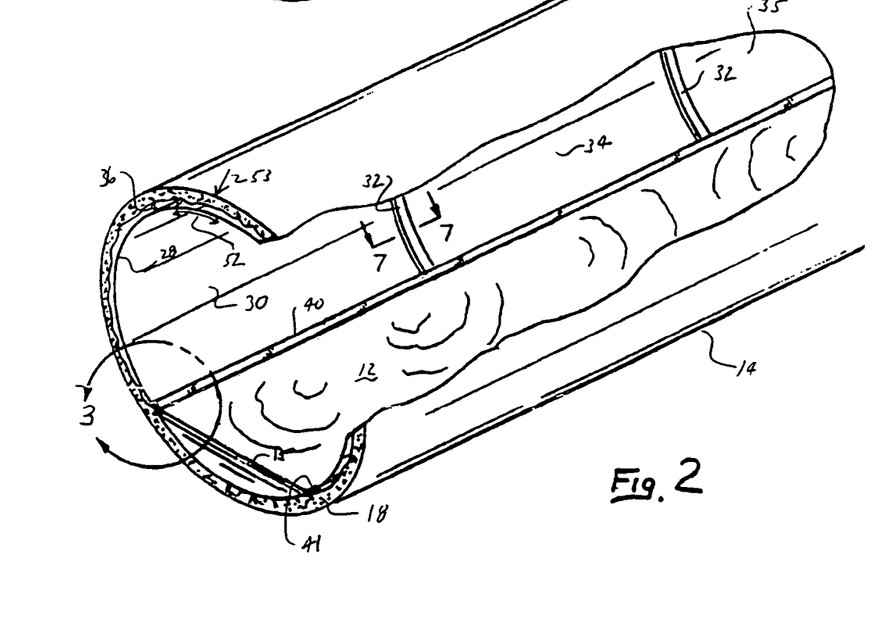
FIG. 2 is a partial perspective, cross-sectional cut away view of a fluid conduit, having a thermoplastic sheet positioned in accordance with the preferred embodiment of the present invention.

Referring to FIG. 2, the structure and method of the present invention include the provision of a sheet 28 of thermoplastic material, such as, for example, polyvinyl chloride. The polyvinyl chloride sheet 28 in this invention is a semi-rigid sheet positioned within the conduit 14 in linearly installed sections 30, 34, 35 joined by seams 32. As the restoration progresses, the next contiguous linear section 30 is positioned and joined to the last previous section 34 through a gas-tight seam 32, which will be described in greater detail below.

The sheet 28 is positioned in a location exactly pre-selected by design as may be desired by those responsible for determining the specifications for the resulting, restored conduit 14. Such a precise positioning and location of the sheet 28 results in a space or void 36 between the thermoplastic sheet 28 and the corroded interior surface 22 of the conduit 14. The sheet 28 may be seen as having two opposing faces, a first face 70 facing the corroded surface 22 of the substrate 18, and the second face facing the interior of the conduit 14 where the waste water 12 flows.

Figures 3, 4:
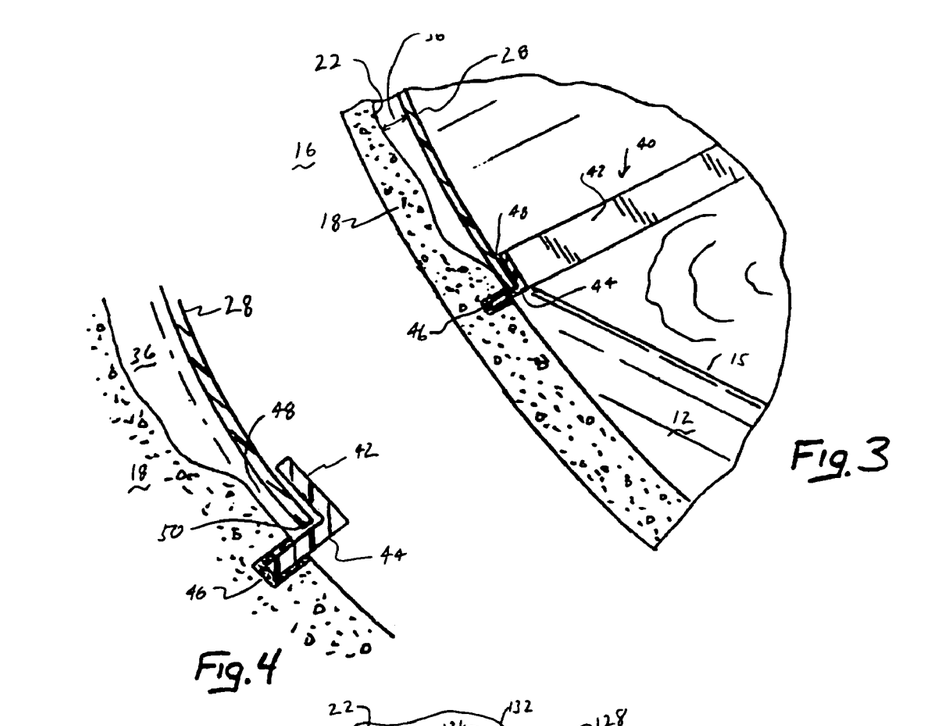
FIG. 3 is a detailed blow-up of the positioning channel of the preferred embodiment of the present invention taken along line 3—3 of FIG. 2.
FIG. 4 is a blow-up of a detail of the channel of FIG. 3.

Sections of the thermoplastic sheet 28 are positioned within the conduit 14 by first installing an "L" shaped channel 40, better seen in FIG. 3 of the accompanying drawings, where like reference numerals correspond to the corresponding reference numerals in previous figures. The "L" channel 40 comprises a first flange 42 and a second flange 44 perpendicular to it. A cut 46 is made into the substrate 18 along the length of the conduit 14 from the interior surface 22 at or near the low liquid level 15. The cut 46 is relatively shallow, sufficiently deep enough to receive a portion of the second flange 44 of the "L" channel 40. It is not contemplated that the depth of the cut 46 will be enough to affect the structural strength of the substrate 18 and will be filled thermosetting resin. When the channel 40 is fitted with one of its flanges 44 into the cut 46, the "L" channel 40 makes, in effect, an "U" channel 48 with the interior surface 22 of the substrate 18.

The lower edge 50 of the sheet 28, better seen in FIG. 4, is inserted into the channel 48 to abut the interior of the flange 44. Preferably, prior to inserting the edge 50 of the sheet 28 within the "U" channel 48, the channel 48 is filled with a thermoset material, which will link at a molecular level with the thermoplastic sheet 28 and the substrate 18 in a paste form that sets as a high-strength solid relatively quickly, on the order of ten minutes. The flange 44 of the "L" channel 40 is inserted linearly along the conduit 14 into the thus filled cut 46 while the thermoset material is still a paste. The channel 48 should receive the edge 50 of the sheet 28 closely.

On the inside surface 22 of the substrate 18 generally opposite the location of channel 40, a similarly shaped "L" channel 41 is secured similarly into the surface 22 to result in, in effect, an "U" channel 49 between the surface 22 and the "L" channel 41. The edge or end 51 of the sheet 28 opposite its end 50 is similarly inserted between the channel 41 and the surface 22. The bend required of the sheet 28 in thus positioning the two opposing edges 50, 51 within their corresponding channels 48, 49, forms an arc within the conduit 14 which coincides with the original surface 20, as shown in broken line in FIG. 1, of the conduit 14 as originally constructed. The sheet 28 could be positioned or located in other positions or locations, as the designer may specify, to result in an ultimate interior diameter, or other physical configuration, including load bearing capacity, as may be pre-determined. For example, the interior could be made to have a trapezoidal coss-sectional configuration, or some unique cross-sectional configuration, if such is desired. All that is required is to bend the sheet 28 into such a cross-sectional configuration when positioning or locating the sheet in fixing the sheet 28 to the interior surface 22 of the conduit. In this manner, the ultimate resulting interior dimensional specifications of the restored conduit can be precisely selected and predetermined.

The thermoplastic sheet 28 is made by extruding. The thermoplastic material of sheet 28 is selected preferably to have sufficient flexibility to bend the sheet 28 into the desired, predetermined position or location as shown in FIG. 2, but sufficiently rigid to fully support the weight of the relatively lighter weight, cellular material 54 that will fill the space or void 36 created by the positioning of the sheet 28, as will explained in greater detail below. Thus, if the ultimate interior diameter of the restored conduit is small, the flexibility of the sheet material must be greater. Conversely, if the resultant interior diameter is specified to be greater, the sheet 28 need not be as flexible.

Further, the thermoplastic sheet 28 is selected to provide a high resistance to tensile stresses, indicated generally by the bi-directional arrow 52 better seen in FIG. 2.

Figures 5, 6, 9:
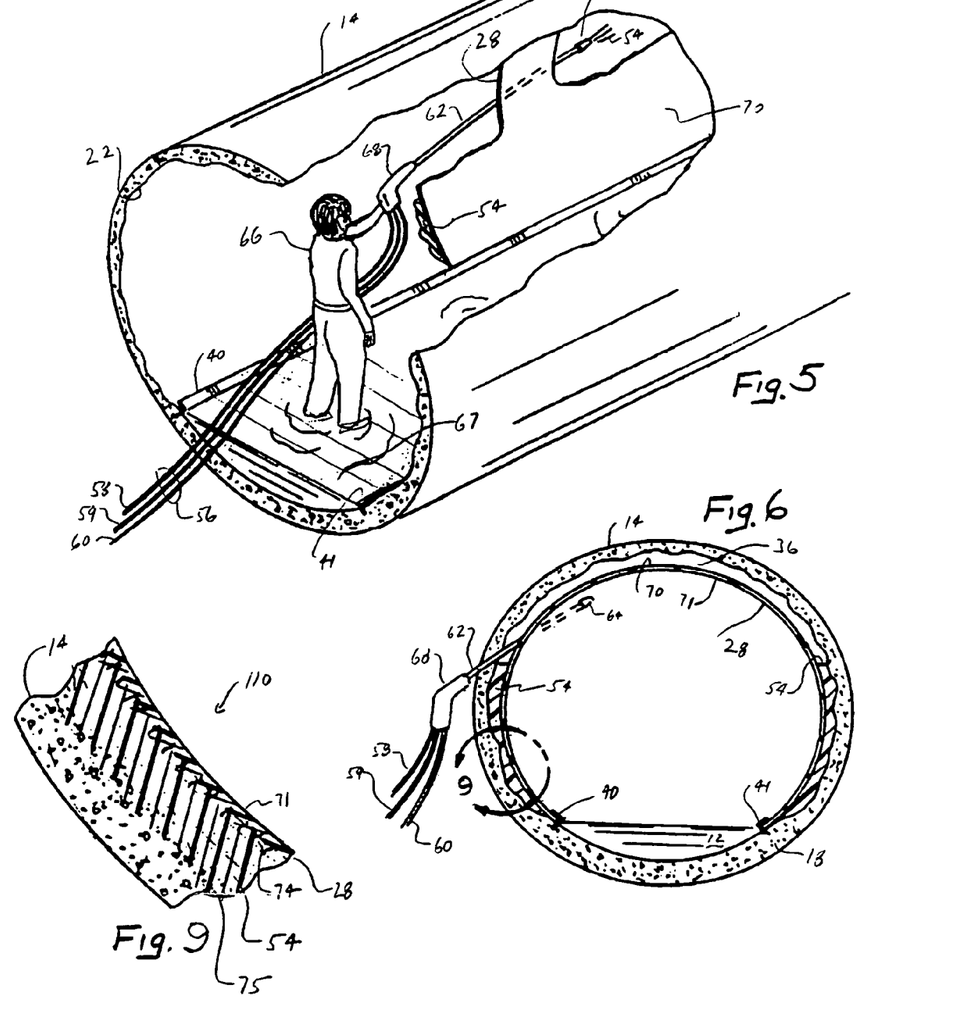
FIG. 5 is a perspective, partial cut away view of the preferred embodiment of FIG. 3 showing the insertion of mixed resin, curing agent and blowing agent.
FIG. 6 is a cross-sectional view of conduit showing the step of inserting cellular material into the composite structure of the preferred embodiment of the invention.
FIG. 9 is a detailed blow-up view in cross-section of a portion of the composite structural material of the preferred embodiment of the present invention, as seen along line 9—9 of FIG. 6.

Referring to FIGS. 5 and 6, the application of the thermosetting material 54 into the space or void 36 between the thermoplastic sheet 28 and the corroded interior surface 22 of the conduit 14 is shown. After the sheet 28 is positioned by being fixed between the channels 48, 49 as described above, the thermosetting material 54 is filled into the space 36. The individual elements for forming the thermosetting material are conveyed to the general site through the conveyance 56, which has three separate hoses 58, 59, 60 within it. The hose 58 conveys the thermosetting resin. The hose 59 conveys the curing agent. The hose 60 conveys the blowing agent, such as for example, carbon dioxide (CO2), for making the resulting thermoset 54 cellular. Other gases such as nitrogen, for example, may also be suitable. Two elements, namely the thermosetting resin and the curing agent are mixed in a gun 68. After mixing, a blowing agent, such as CO2 is injected and the mixture is expanded, and conveyed in expanded form to the location between the sheet 28 and the interior surface 22 through the elongated frothed polymer dispensing tube 62, having a nozzle 64 at its far end. After the polymer is dispensed, a second blowing or foaming agent, water that is in the resin, reacts to expand further the material. An applicator 66 holds the gun 68 to direct the nozzle 64 between the sheet 28 and the surface 22 in order to fill the space 36 from the bottom up and from the rear of the section 30 toward the edge where the applicator 66 stands. The applicator 66 stands on the staging 67, provided just above the night time, daily low flow level of the waste water 12.

The width of the sections, such as section 30 of the thermoplastic sheet 28 is on the order of four feet, so that the dispensing tube 64 should be on the order of five feet or more in order to permit the applicator 66 to insert the dispensing tube 62 far enough into the space 36 to direct the now expanded cellular thermosetting mixture 54 all of the way to the joinder or seam 32 connecting section 30 to the previous, proximal section, not shown, in the process.

As better seen in FIG. 6, the thermoset 54 is dispensed in such fluid form that it flows downward to fill the space 36 from the bottom upwardly. The applicator 66 will fill the space 36 from the far end of the sheet section 30 towards himself. Since the resin from hose 58 and curing agent from the hose 59 are mixed with the blowing agent from the hose 60 at the gun 68, which is a substantial distance from the nozzle 64, the resin, curing agent and gas should expand substantially by the time the cellular material 54 is shot from the nozzle 64. There is some weight in the cellular material 54, and the thermoplastic sheet 28 must be rigid enough to support this weight when the cellular material 54 has filled the space 36. It has been found that for a conduit 14 of approximately sixty inches or five feet original interior diameter, and where the cellular material 54 is a polyurethane foam having a density of from approximately 17 pounds per cubic foot to 23 pounds per cubic foot, a polyvinyl chloride sheet having a flexural modulus of approximately 500,000 plus or minus 150,000 is suitable. It is believed that the polyurethane foam will perform best and provide the necessary restoration in densities ranging from ten pounds per cubic foot to fifty-five pounds per cubic foot.

The thermoplastic material of sheet 28 is in the preferred embodiment a polyvinyl chloride. The sheet has two faces. A first face 70 faces the space 36 and interior surface 22 of the substrate 18. The second face 71 faces the interior of the substrate 18. The face 70 facing the space 36 is treated prior to installation within the conduit 14, by treating that surface with 2-propenoic acid, 2-hydroxypropyl ester, polymer with chloroethene and ethenyl acetate reactive resin having a density of 1.37 grams per cubic centimeter at 25 degrees Centigrade and a molecular weight of from 8,000 to 10,000. The reactive resin may contain a catalyst to enhance and cause a preference for a molecular linkage between the thermoplastic sheet 28 and the thermoset material 54. Such a treatment impregnates the polyvinyl chloride sheet 28 through that surface 70, leaving hydroxyl ions along with the catalyst on the surface 70 available for bonding with the isocyanate or other bonding agent which is part of the curing agent for the thermosetting resin. When the curing agent is mixed with the thermosetting resin in the gun 68, an adequate quantity of the isocyanate is calculated and included when conveying the mixture 54 in the delivery tube 62, for bonding with the hydroxyl ions resulting from the treatment of the surface 70 of the polyvinyl chloride sheet 28. Where the thermosetting resin is polyurethane resin or substantially polyurethane resin, and the curing agent is substantially isocyanates, it has been found that a volumetric ratio of isocyanate to resin of from 1.02:1 to 1.10:1 will provide the necessary quantity of the isocyanate.

When the thermoset 54 is filled within the space 36, the isocyanate will chemically bond with the available hydroxyl ions embedded to the sheet 28 to create an integrated, composite structure comprising a polyvinyl chloride region at one end, a region on the other end comprising the cellular thermoset material 54, and, in progressing across the cross-section from one to the other, an interphase region 74 where the polyvinyl chloride with its available hydroxyl ions have molecularly integrated with the isocyanate of the cellular thermoset 54. This bonding is universal and generally complete over the entire active treated area of the first face 70 of the polyvinyl chloride sheet 28, and the corresponding area of the thermosetting material 54 coming into contact with the face 70 after the thermosetting material cures and sets.

The thermosetting resin preferably comprises a polyurethane resin. The resin has mixed in it suitable surfactants, amines and silanes. The characteristic of silane allows the material of which it has been included, to bond chemically with many minerals commonly present in most cementitious, ceramic and metallic substrates, of which most sewer conduits are made. Suitable silanes can be obtained commercially. Silanes will chemically bond with the substrate 18, whether made primarily of concrete or other cementitious material, or clay, brick or metal.

The insertion of the expanded, cellular thermosetting material 54 into the space 36 allows the thermosetting material 54 to work into the pores and interstices 76 of the substrate 18. A suitable surfactant or surfactants may be added to the thermosetting material 54 in order to facilitate such working of the thermosetting material 54 into these pores and interstices 76 emanating into the substrate 18 from the corroded surface 22, as more fully described in my U.S. Pat. No. 5,389,692, the description of which is incorporated herein as though fully set forth in detail. The silane in the thermosetting material 54 will chemically bond to the substrate 18, to establish an interphase region 75 between what ultimately becomes the thermoset 54 and the substrate 18. The thermoset material 54 and the substrate 18 become a single, chemically integrated continuous and composite material and structure by virtue of both mechanical bonding of the thermoset material 54 setting within the pores and interstices 76 of the substrate wall 18, and chemical bonding of the silane in the thermosetting material 54 with the minerals, such as, for example, silica within the substrate wall 18.

Adjoining sections 30, 34 of the thermoplastic sheet 28 are seamed together at seam 32. A suitable seam or channel bar 32 of polyvinyl chloride is shown in greater detail in FIG. 7, where section 30 has its lateral edge 86 inserted into the "U" channel 80 created by the flanges 82, 84 of the channel bar 32. Similarly on the opposing end of the channel bar 32, sheet section 34 has its lateral edge 94 inserted into the "U" channel 88 created by the flanges 90, 92 of the channel bar 32. The portions of the surfaces of the impregnated thermoplastic sheet sections 30, 34 are inserted into the corresponding channels 80, 88. In this manner, the hydroxyl ions on the impregnated sheet 28 made available on such activated surfaces can molecularly bond with the interior surfaces of the channels 80, 88 to make a more secure liquid and gas tight seal between the sections 30, 34. Further, a thermosetting paste can be inserted within the channels 80, 88, as described herein above for the channels 48, 49, to make a secure liquid- and gas-tight seal, as well as making a molecular linkage between the thermoplastic component parts. The channel bar 32 can be made of a suitable thermoplastic material, and extruded in the specified shape.

Figure 8:
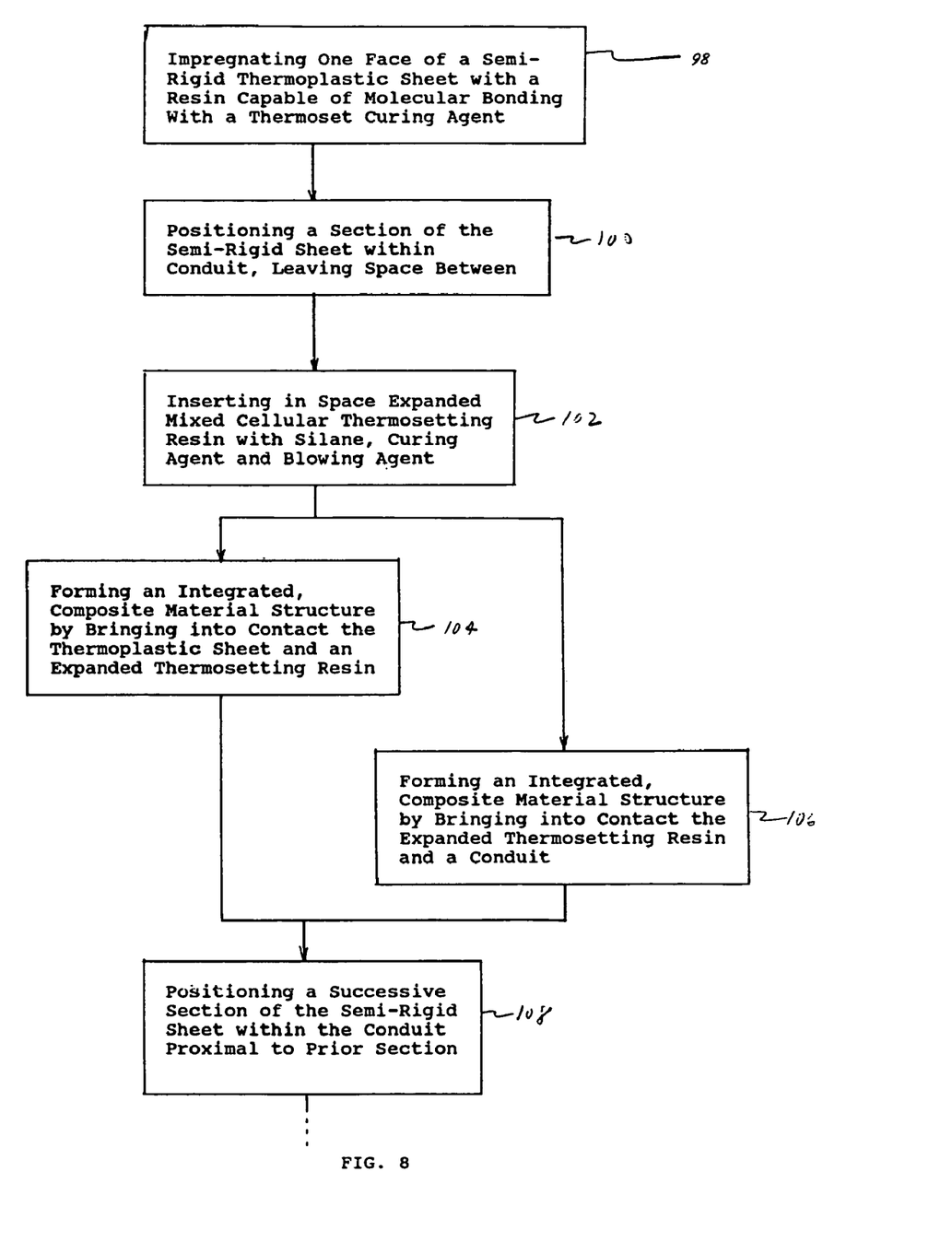
FIG. 8 is a block schematic diagram showing the method of forming the integrated, composite structural material of the preferred embodiment of the present invention.

A method for restoring a corroded sewer conduit 14 has an initial step 98, as indicated diagrammatically in block form in FIG. 8 of the accompanying drawings, of initially impregnating a first face 70 or surface of a section 30 of thermoplastic sheet 28 having sufficient flexibility to be fixed within the conduit 14 and to the interior of the substrate 18 after being bent into the shape defining the predetermined interior physical dimensions selected by the engineer or designer responsible for restoration. The thermoplastic sheet 28 is in a preferred embodiment a polyvinyl chloride. The polyvinyl chloride is, preferably, an extruded thermoplastic sheet 28 capable of resisting chemical deterioration and permeation when exposed to, or in contact with, the corrosive gases, acids, bacteria and other corroding elements found in a waste water sewer system. The side or surface of the sheet section 30 which is to be positioned facing the interior surface 22 of the corroded concrete substrate 18 is treated and activated so as to form a chemical bond with materials included in a thermosetting material, such as, in the case of polyvinyl chloride, the impregnation of the surface with a substance that results in free hydroxyl ions that will bond chemically with isocyanate in a thermoset curing agent for a thermosetting resin.

The sheet 28 or layer could be a polyethylene or any thermoplastic. The surface of the polyethylene or other thermoplastic sheet that will face the interior surface of the concrete conduit when fixed into position, can be treated for bonding with the thermoset, by ionizing or roughening the surface with a gas flame propane or methylacetylene propane. The surface may also be prepared by a discharge of electrical energy through the polyethylene or other thermoplastic sheet in a corona spectrum. Other thermoplastic materials may be found suitable.

In a second step 100, a section 30 of the sheet 28 of semi-rigid thermoplastic material is positioned and fixed in a predetermined and pre-selected position or location within the interior of the conduit 14 to define the interior physical dimensions and/or configuration designed by the engineer or designer. In the case of a conduit substantially circular in cross-section, this step defines the ultimately resulting interior diameter. In this step, also, the positioning defines the interior surface that will face the waste water in the ultimately restored conduit, including the chemical composition. This surface should be corrosion resistant and impermeable to corrosive gases and liquids. This positioning step 100 also defines the space 36 between the sheet 28 and the corroded interior surface 22 of the substrate 18. The positioning is accomplished by first defining that part or portion of the interior of the substrate, that is to say, what portion of the circumference within the interior of the substrate that is to be restored. As noted herein, I intend and mean to include conduits which are rectilinear in cross-section when describing distances along the circumference of the conduit substrate. The limits or boundary of the interior surface of the substrate that is to be restored, is defined by first installing or fixing opposing channels into which opposing edges of the thermoplastic sheet can be inserted and thereby fixed. In the preferred embodiment, the channels are filled with a thermosetting material that will receive and set with the sheet to prevent the corrosive elements of the waste water from penetrating between the sheet and the substrate or soaking and damaging any materials therebetween. The next contiguous section is joined to the next previous section by a seam having a channel on both linear side edges for receiving the joining edge of the corresponding thermoplastic sheet sections. These channels also may be filled with the thermosetting material used in the opposing channels formed on the surfaces of the substrate described above, to create a molecular bond between the sections that will resist penetration behind the sheet sections by the corrosive elements of a sewer system.

The seam can be extruded comprising a thermoplastic material, selected and designed to have a substantial strength to provide a linearly spaced, periodic arched hoop, in effect, contributing to the support of the thermoplastic sheet, and of the thermosetting material. Such added strength will also contribute to resisting loading stresses endured by the conduit after restoration.

In a next step 102, the components of a cellular thermosetting material, namely the thermosetting resin, the curing agent and the blowing agent are inserted into the void or space 36 created by the positioning of the thermoplastic within the conduit 14. In the preferred embodiment, the thermosetting resin is a polyurethane resin, and the curing agent is an isocyanate. The resin has mixed in it suitable surfactants, amines and silanes. Normally, the setting reaction between the polyurethane resin and the isocyanate is highly exothermic and destructive to the thermoplastic sheet, by definition. However, I have found that creating a froth foam with a lower mass using carbon dioxide, limits the thermal transfer capabilities between the thermosetting resin 54 and the thermoplastic sheet 28, resulting in little or no thermal distortion. The polyurethane resin, the isocyanate and the initial blowing agent are conveyed in separate hoses from their respective storage locations to a mixing gun portably located at the location of the fixed sheet 28 within the conduit. The gun has an elongated, extended polymer dispensing tube extending from the gun to the nozzle. In the preferred embodiment, the initial blowing agent is carbon dioxide gas ($CO_2$), followed by a secondary blowing agent, which is water in the polyurethane resin 54. In any event, the blowing agents and equipment should be selected to result in a microcellular thermoset material 54 having small, closed cells evenly distributed throughout at least the central portions of the material 54. The two components, that is the thermosetting resin and the curing agent are mixed within the gun located at the fixed sheet section 30. The initial expansion of the mixed components occurs after the mixing of the thermosetting resin and curing agent. This expansion may occur within or after the mixing gun, and in the polymer dispensing tube extending therefrom. In the preferred embodiment where the thermosetting resin is a polyurethane resin, a second blowing agent, water in the resin, reacts to expand further the mixed thermoset material 54. In the two-stage blowing method, the heat generated from the exothermic reaction of the polyurethane resin and the isocyanate, and the expansion of the mixed components will not deleteriously affect the polyvinyl chloride sheet 28. If the exothermic reaction were to take place while in contact solely with the sheet 28 in a higher density, that is without the initial frothing, the exothermic heat would melt or significantly distort the sheet 28. Moreover, if a significant amount of the expansion is accomplished prior to the material being shot from the nozzle, the possibility of a violent reaction will be eliminated. The conditions for a violent reaction can develop within the void or space defined by the positioning of the sheet and a high cross-link density of the resulting thermoset.

I have found that the rheology of the thermosetting components is important in achieving the results of this invention. The viscosity of the polyurethane resin, and of the isocyanate co-polymer must be controlled in storage and in the hoses conveying each of these elements to the mixing and blending gun, in the gun, and in the dispensing tube extending from the gun to the nozzle. Normally, the co-polymers must be handled with elevated temperature. However, too high of a temperature inhibits or prevents the formation of a resulting cellular thermoset. I have found that maintaining the co-polymer temperatures in the range of from approximately 90 degrees Fahrenheit to approximately 140 degrees Fahrenheit permits suitable handling and flow of these components within the hoses 58, 59, 60, and allows the ability to control the size and structure of these component materials during mixing. Within this temperature range, wetting and penetration of the substrate 18 is highly enhanced. This penetration is important to the ability of my integrated composite material to transfer loads and thus enhance the structural properties of the conduit 14 once the cellular thermoset 54 has cured. Furthermore, the flow rate of the mixed materials within the dispensing tube 62 and within the void or space 36 should be sufficiently fast to obviate any problem.

I have found that the thixotropy of the mixed materials within the dispensing tube and within the void or space is also important. It may be desirable to add cycloaliphatic and aromatic amines to control the rate of thickening or, as sometimes called, the rate of "urea bodying." The rate of thickening ideally should be such that the mixed material ceases running when the material reaches the bottom of the void or space 36 and reaches the forward edge of the sheet section 30 being completed at the time of application. If the material does not thicken quite fast enough, running can be prevented by placing a bulkhead at the open edge of the section 30 of the sheet 28 being worked.

While I have found polyurethane to be a good material to accomplish the results desired for the ultimate, composite material and structure of my invention, unsaturated polyester, epoxy and polyurea can be formed and used, as well. Indeed, various applications will suggest various combinations of these thermosets as the thermoset material of choice.

The next two steps 104, 106 occur at generally the same time. In step 104, the sheet 28 through its first face 70 is molecularly bonded and results in complete molecular adhesion to, and integration with the sheet 28 and the cellular thermoset 54. Indeed, a new composite is formed in the interphase region 74 between the sheet 28 and the cellular thermoset 54.

In the step 106, occurring at generally the same time as the step 104, wetting and penetration results in complete adhesion of the cellular thermoset 54 to the substrate 18. Indeed, a new composite material region is formed in the interphase region 75 between the cellular thermoset 54 and the substrate 18. For example, silane, when included within the thermosetting resin 58, molecularly bonds with minerals, often silica within the material of the substrate 18 to form a chemically continuous bond over substantially the entire interphase area 75 between the thermoset 54 and the substrate 18.

A sixth step 108 provides a succeeding section of the sheet 28 by locking and sealing this succeeding section to the last or previous section by locking and sealing the two sections together by a channel bar or seam 32. The channel bar 32 comprises a thermoplastic material strong enough to provide additional strength to the sheet 28 in its load bearing and distributing functions. The material of the seam 32 may also be predetermined and selected to have greater imperviousness to heat used or generated in the thermosetting procedure. I have found that chlorinated polyvinyl chloride is good for forming the channel bar or seam 32.

The resulting structure, as depicted in the schematic cross-sectional cut-away view or slice in FIG. 9, is a chemically integrated and continuous, composite structure 110 having some five regions, each with differing physical characteristics contributing to a conduit much stronger, more resilient and longer lasting than the conduit, even as originally constructed. The resulting structure is alternatively described as having three layers: a porous, mineral containing substrate layer 18, a layer of thermosetting material 54, and a layer of thermoplastic material 28. The interfaces between adjacent ones of the three layers are characterized by strong covalent bonds. Significantly, the resultant structure 110 makes use of the entire pre-existing, corroded substrate 18 and whatever residual strength and physical characteristics the deteriorated substrate 18 possessed prior to restoration.

Notably, as seen progressing from the interior to the outside of the conduit, the initially encountered region within this composite, continuous chemically integrated structure is the polyvinyl chloride 28 having its second face 71 facing the interior of the conduit 14. This second face 71 has the ability to withstand chemical deterioration from the corrosive gases, acids and other elements. Continuously progressing toward the outer shell or reach of the conduit 14, the next region 74 comprises the chemically bonded hydroxyl ions with the isocyanates, which themselves are part of the thermoset material 54. The next region 54 interphased within this composite, integrated structure is the cellular polyurethane 54, providing strength and resiliency, as described in my patent, U.S. Pat. No. 5,389,692 which is incorporated herein as though fully set forth.

Wetting agents, including compounds such as the silanes within the thermoset 54 that have chemically bonded with the composition of the original conduit substrate, help to form the next region 74 in the continuous chemically integrated composite structure 110. Finally, the newly formed composite, chemically integrated structure 110 contains the entire substrate 18 pre-existing prior to restoration. The restoration is completed and results in a structure 110 that takes full advantage of all of the physical properties of the original conduit 14 and the substrate 18 pre-existing before the restoration, yet results in a new, chemically integrated, composite structure having physical properties of various added constituents that gives the restored conduit substantially greater life span and chemical resistance characteristics and structural strength than possessed by the deteriorated conduit, even greater than the conduit when newly constructed.

For example, the polyvinyl chloride region on the inner surface 71 of the new composite material 110 may be predetermined to have a substantial tensile strength, since it has been found that failure of conduits under normal standard test procedures, often occurs by the interior surface of the conduit cracking or splitting under tensile stresses 52 (FIG. 2). Maximum resistance to compressive stress 53 is also achieved, since the original substrate 18 remains at the outer surface of the new integrated composite structure 110 of the restored conduit. The original conduits are generally designed to resist compressive stresses. In addition, the compressive strength of the new composite structure is greatly augmented by the more resilient cellular thermoset region 54 in the middle of the new integrated, composite structure 110 after the restoration. The compressive stresses 53 impinging from the outside, top surface of the substrate 18, in the material and structure of the restored conduit, will be distributed and transferred such that the region of polyvinyl chloride sheet 28 will sustain substantial tensile stresses 52 at the inside crown or soffit area of the conduit. However, polyvinyl chloride is well suited to withstand tensile stresses 52, especially if it is selected to have tensile strength. In this manner, the compressive stresses 53 on the top or crown area of the restored conduit, are substantially reduced in the substrate 18 region, and are transferred to the polyvinyl chloride 28 region. The resultant, integrated composite material and structure 110 of the present invention will not fail under standard American Society of Testing Materials ("ASTM") D-load testing procedures until much higher loading than typical conduits, even cementitious conduits having standard steel bar reinforcement.

The integrated, composite structure resulting from the present invention, has greatly increased load bearing characteristics. The several load transferring interphases between the proximal regions is complete, thorough and cover the entire areas between the proximal regions, so that any load is more evenly from one region through and to proximal regions. Thus, compressive loads, generally indicated by the directional arrow 53 of FIG. 2, will be passed more evenly and freely through the interphases of the region comprising the integrated, composite material and structure 110 so that the cellular thermoset region, as well as the polyvinyl chloride layer will receive, and share load. Thus, at the level of the widest point in the conduit, the polyurethane an the polyvinyl chloride sheet, both, will assume much more of the vertical, compressive load endured previously by the original portion of the conduit because of this universal-area bonding throughout the interphases of the regions. The load transfer in many prior art solutions, transfers load by bolts, spikes and/or ridges or even merely by friction. Where such a load transfer is by friction, the vertical load will exacerbate the tendency of the thermoplastic liner or layer, as well as the surface repair material, to delaminate and separate from the underlying substratum to which the thermoplastic is attached. Even where the thermoplastic sheet is held to the cementitious material by ribs or spikes, corrosive waste water and sludge can penetrate between the thermoplastic sheet and the substratum, again resulting in corrosion of the non-bonded surface areas of the facing but non-molecularly bonded surfaces of the proximal layers.

The interior surfaces of the "L" channel 40 may also be treated with the reactive resin as indicated herein above, so the edges 50, 51 of the polyvinyl chloride sheet 28 will molecularly bond within the channels 48, 49.

The cellular thermoset region 54 may be enhanced, it is believed, by increasing the molecular bonding in the individual polyols by increasing the functionality of the individual polyols. By increasing the hydroxyl sites in the individual hydrocarbon chain and increasing the functionality of the isocyanate, a greater strength is achieved in the thermoset material 54. It is believed, further, that by increasing this cross-linking density, an even more efficient transfer of load through the integrated composite material 110 will be obtained and the flexural modulus will be increased. This increased strength of the thermoset 54 should allow the restoration engineer to design thinner layers or regions of the thermoset region 54, and consequent positioning of the thermoplastic sheet 28 closer to the substrate 18, while maintaining the load bearing and the load distributing characteristics necessary for the project at hand.

Figures 7, 10:
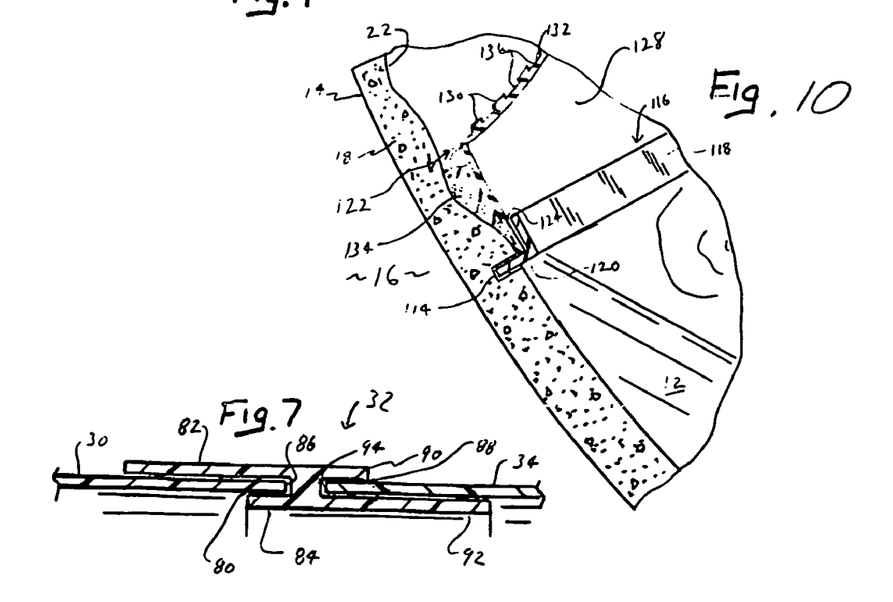
FIG. 7 is a cross-sectional view taken along line 7—7 of FIG. 2, of a seam showing joiner of successive sections in the preferred embodiment of the present invention.
FIG. 10 is a cross-sectional view of an alternative embodiment of the present invention; and, FIG. 11 is a partial perspective view of the thermoplastic sheet section of the alternative embodiment of FIG. 10.
Figure 11:
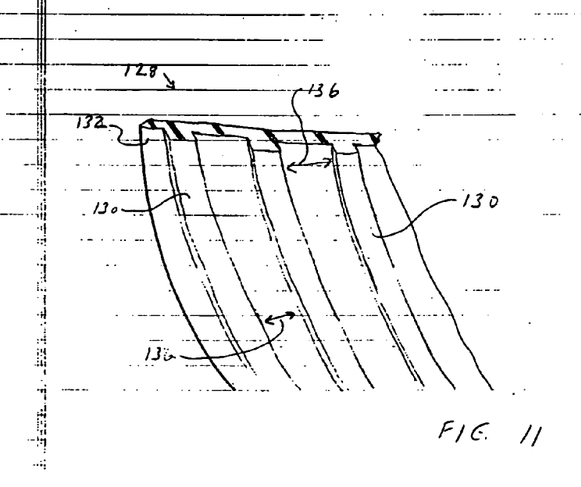

In FIGS. 10 and 11, an alternative embodiment is shown in which the conduit 14 has a substrate 18 within the ground 16, as in the preferred embodiment of FIGS. 2–9. Further, liquid 12 flows in the conduit 14. Similar to the embodiment of FIG. 2, a cut 114 is cut in the surface 22 of the conduit 14, for receiving a flange of an "L" channel 116. The "L" channel 116 comprises a flange 118 perpendicular to flange 120. Flange 120 is inserted into the cut 114, which may be treated and activated as described above. Alternatively, or in addition, the cut 114 may have a thermosetting paste inserted into the cut 114 prior to the insertion of the flange 120. In any event, the flange 120 can be cured in the cut 114, resulting in an "U" channel 124 formed by the flange 118 and the surface 22 of the substrate 18, as shown, in a manner similar to the formation of channel 48 of FIG. 4 in the preferred embodiment. A complemental channel is formed by a complemental flange being fixed in the surface 22 of the substrate 18 on the opposing surface portion within the substrate 18, not shown in this FIG. 10 but similarly positioned as is the channel 41 in relation to channel 40 in FIGS. 2 and 6, above.

In this alternative embodiment, a thermoplastic sheet 128, which again may be made of polyvinyl chloride, has an edge which is inserted into the channel 124, and an opposing edge inserted into a complemental channel formed on the surface 22 opposing channel 124, to form an arch within the conduit 14 and define a void or space 122 between the sheet 128 and the interior surface 22. The sheet 128 is formed having ridges 130 built up from the first surface 132 of the sheet 128. These ridges 130 inherently provide additional strength to the sheet 128 as it is bent into its position between the channels (124) and arched over inside the conduit's interior. Further, when the cellular thermoset materials, mixed and expanded in and through a gun which is the same as gun 68 of the preferred embodiment, are shot into the void or space 122 between the sheet 128 and the interior surface 22, the resulting thermoset 134 will set or cure to mechanically lock within the valleys 136 between the ridges 130, to add a mechanical connection to the molecular bonding between the curing agent of the thermosetting material and the available hydroxyl ions in the thermoplastic material of sheet 128.

The chemical bonding interphase region 74 between the thermoplastic region 128 and the thermoset region 134 in this alternative embodiment extends throughout the side or face 132, including, significantly, the side surfaces of the ridges 130 that are perpendicular to the interior facing side of the sheet 128. The bonding is the same in this perpendicular area or surface as for the region 74 of the preferred embodiment. Any forces or stresses that tend to pull the protective layer or sheet region 128 away from the composite structural material of this alternative embodiment, must inherently shear the thermoplastic material 128 away from the thermoset region 134 along these perpendicularly oriented sides. The molecular bonding of the present invention is believed even more effective in resisting shear than in direct pull. The bonding area in the integrated composite material of this alternative embodiment is, like the preferred embodiment, substantially universal over all of the interphased area between the thermoplastic region 128 and the thermoset region 134. Therefore, this embodiment will provide greatly increased shear strength, that is greatly increased resistence to shearing of the sheet region 128 away from the thermoset region 134, and would likely cause a core failure in the thermoset 134 or the substrate 18. Also, this alternative embodiment reduces the ability of any force to pull the sheet 128 off of and away from the restored conduit, which has happened and results in clogs within the sewer.

In addition, the ridges 130 of additional polyvinyl chloride arched within the interior of the conduit and oriented circumferentially around the sides and top, or soffit of the conduit, as they do in this alternative embodiment of FIG. 10, provide added mechanical strength for accepting load transferred to the polyvinyl chloride sheet region 128 from the substrate 18 and thermoset regions 134 of the resulting integrated, composite material and structure. Of yet further advantage, the surface area of the first face of the polyvinyl chloride sheet 128 is greatly increased, providing heat radiating and transfer characteristics between the sheet 128 and the thermoset 134 regions, as well as significantly increasing the bonding area between the two regions. By this heat transfer characteristic, the cooling of the thermosetting materials 134 will be faster, causing the density of the thermoset 134 proximate to the interphase region 74, and within the interphase region 74 to be slightly higher.

It may be seen that by either of the embodiments described herein, or by additional embodiments that may be perceived, the structure and the methods of my invention restores a deteriorated conduit results in a continuous, chemically integrated composite material and consequent structure that fully incorporates and utilizes whatever physical characteristics the deteriorated conduit has prior to restoration. Further, the new composite, integrated material and structure resulting from these methods has much stronger physical characteristics than the existing conduit, or even the conduit as originally constructed. By choice of the material for the inner portion or region, the resulting, restored conduit can be made to have a high tensile strength on its inner surface, where tensile stresses maximize, and where failure is often first observed in standard conduit testing. Simultaneously, concrete, which is selected often for its resistance to compressive stresses, remains on the outside of the resulting structure of my invention, where compressive stresses maximize under standard concrete pipe testing procedures. In an ASTM C78 standard structural engineering beam test, a polyurethane thermoset of one inch depth and six inches width and having a density of approximately 23 pounds per cubic foot molecularly bonded with a concrete beam substrate of five inches depth and six inches width to form an integrated composite, failed at 21,000 pounds. The control sample of concrete having six inches depth failed at 5,500 pounds.

The cellular thermoset formed in the middle region of the structure of my invention provides resilient, flexible but tough strength to the resulting composite, integrated material and structure. Further, the bonding between the various regions is molecular, and is universal substantially throughout the interphases between the proximal regions, which has the advantage of transferring loads from the outside of the conduit throughout the resulting integrated material and structure.

While the present invention is described showing the forming of an integrated composite material around only a portion of the circumference of the interior of the conduit to be restored, it may be appreciated by those skilled in the art that the integrated composite structure can be formed around substantially the entire 360 degrees of the circumference of the interior or, in the case of a rectilinear or non-circular cross-section, substantially around the entire closed "circumference" of the structure, as the term circumference is used herein.

The foregoing description of my invention and of preferred embodiments as to products, compositions and processes is illustrative of specific embodiments only. It is to be understood, however, that additional embodiments may be perceived by those skilled in the art. The embodiments described herein, together with those additional embodiments, are considered to be within the scope of the present invention, which is to be defined only by the appended claims.

I claim:

1. A corrosion-resistant chemically continuous composite conduit having an inside and an outside, said conduit comprising from the outside to the inside:
    a) a first layer comprising a porous, mineral-containing substrate;
    b) a second layer comprising a thermosetting material, said thermosetting material containing a surfactant, a silane, and curing agent comprising isocyanate groups;
    c) a third layer comprising a thermoplastic material, said thermoplastic material impregnated with a reactive hydroxy-bearing resin;

wherein an interface between said first and second layers comprises covalent bonds between said silane in said second layer and minerals in said first layer;

wherein an interface between said second and third layers comprises covalent bonds between said isocyanate groups of said second layer and said reactive hydroxyl-bearing resin of said third layer;

wherein said second layer is sufficiently rigid to transmit stresses between said first and third layers;

wherein said third layer has a tensile strength sufficient to support a portion of said stresses; and wherein said first, second and third layers are bonded together with sufficient shear strength to transmit and distribute said stresses between said layers.

2. The conduit of claim 1, wherein said first layer comprises a cementitious, ceramic, clay, brick, or metallic substrate.

3. The conduit of claim 1, wherein said thermosetting material is polyurethane resin.

4. The conduit of claim 1, wherein said reactive resin is a polymer, said polymer being a copolymer of 2-propenoic acid, 2-hydroxypropyl ester, chloroethene and ethenyl acetate.

5. The conduit of claim 1, wherein said thermoplastic material is PVC.

6. The conduit of claim 1, wherein said PVC has a tensile strength of 5,000 to 10,000 psi.

7. The conduit of claim 1, wherein said stresses include compressive, tensile and shear stresses due to one or more of earth loads, live loads and hydrostatic loads.

8. A method for lining a porous, mineral-containing conduit, said method comprising the steps of:
    a) impregnating a sheet of thermoplastic material with a reactive hydroxy-bearing resin;
    b) positioning said sheet of thermoplastic material within the interior of said conduit spaced apart from an inner surface of said conduit;
    c) inserting a thermosetting material between said sheet of thermoplastic material and said inner surface, said thermosetting material containing a silane and a curing agent comprising isocyanate groups;

wherein said silane forms covalent bonds with said minerals in said conduit;

wherein said isocyanate groups form covalent bonds with said reactive hydroxyl-bearing resin of said thermoplastic sheet;

wherein said thermoplastic sheet, said thermosetting material, and said conduit are bonded together with sufficient shear strength to transmit and distribute loads between them.

9. The method of claim 8, wherein said conduit comprises a cementitious, ceramic, clay, brick, or metallic substrate.

10. The method of claim 8, wherein said thermosetting material is polyurethane resin.

11. The method of claim 8, wherein said thermosetting material contains a surfactant.

12. The method of claim 8, wherein said reactive resin is 2-propenoic acid, 2-hydroxypropyl ester, polymer with chloroethene and ethenyl acetate.

13. The method of claim 8, wherein said thermoplastic material is PVC.

14. The method of claim 8, wherein said PVC has a tensile strength of 5,000 to 10,000 psi.

* * * * *